US006679107B1

(12) United States Patent
Ono et al.

(10) Patent No.: US 6,679,107 B1
(45) Date of Patent: Jan. 20, 2004

(54) TIMING SENSOR FOR ENGINE

(75) Inventors: Katsumasa Ono, Iwata (JP); Kenji Komatsu, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 404 days.

(21) Appl. No.: 08/515,964

(22) Filed: Aug. 16, 1995

(30) Foreign Application Priority Data

Aug. 26, 1994 (JP) ........................................ 6-225824

(51) Int. Cl.[7] ........................................ G01M 15/00
(52) U.S. Cl. ........................................ 73/117.3
(58) Field of Search ........................................ 73/116, 117.3

(56) References Cited

U.S. PATENT DOCUMENTS 5,269,178 A * 12/1993 Vigmostad et al.
5,287,735 A * 2/1994 Klauber et al.
5,293,776 A 3/1994 Takegami et al.
5,326,321 A 7/1994 Chang
5,860,328 A * 1/1999 Regueiro
6,148,787 A * 11/2000 Takano

FOREIGN PATENT DOCUMENTS

GB 2198853 6/1988

OTHER PUBLICATIONS

European Search Report dated Dec. 5, 1995.

* cited by examiner

*Primary Examiner*—Eric S. McCall
(74) *Attorney, Agent, or Firm*—Ernest A Beutler

(57) ABSTRACT

An improved timing sensor for an internal combustion engine that cooperates with the camshaft and is mounted on a bearing cap of the camshaft. The timing sensor and bearing cap extend through an opening in a cam cover that encloses the area where the camshaft is journaled so that the timing sensor can be removed without removing the cam cover.

11 Claims, 4 Drawing Sheets

TIMING SENSOR FOR ENGINE

BACKGROUND OF THE INVENTION

This invention relates to a timing sensor for an engine and more particularly to an improved engine camshaft timing sensor.

As is well known, in many forms of engine control it is necessary or desirable to provide a signal indicative of the actual rotational position of the crankshaft and/or the position of the piston within its stroke. Although crankshaft sensors may be utilized for this purpose, the crankshaft of the engine is normally located in an area that is relatively inaccessible and which is also exposed to foreign elements and thus subject to contamination. Thus, if the sensor is mounted in this area, its servicing, access, and inspection can be difficult.

It has, therefore, been proposed to mount a sensor in proximity to the camshaft or one of the camshafts of the engine. As is well known, the camshafts rotate at a timed relationship to the crankshaft. Thus a camshaft sensor will provide substantially the same information as a crankshaft sensor. In addition, the camshafts are normally located in a point that is more accessible on the engine and also one which is less exposed to the environment.

Most high-performance engines employ overhead camshafts in which either one or more camshafts are rotatably journaled in the cylinder head for operating the valves therein. Thus, it has been proposed, as shown in U.S. Pat. No. 5,293,776, issued Mar. 15, 1994, in the names of Masaki Takegami and Hideaki Ueda which patent is assigned to the assignee hereof, to mount a sensor in the cam cover for the engine so that its probe is juxtaposed to the camshaft and can provide a signal indicative of the engine timing. Although this type of device is very acceptable and also positions the sensor so that it can be easily accessed, the cam cover itself may require a mounting of the sensor so that it is spaced a rather substantial distance from the portion of the camshaft with which it cooperates to provide the signal. Hence, weak or inaccurate signals may result.

It has also been proposed to mount the camshaft sensor directly in the cylinder head in closer proximity to the camshaft. Such arrangements have a number of disadvantages. First, if the sensor is mounted in the cylinder head, it is necessary to machine an opening in the cylinder head for the sensor. This added machining to the cylinder head increases its cost and also adds to its complexity. Also, if the engine has intake and exhaust camshafts, then the sensor must be mounted in proximity to one of these camshafts.

The intake camshaft is normally provided adjacent the intake manifold, fuel injectors, and various other components associated with the induction system. Hence, the positioning of the sensor on this side can present some difficulty and interference with other components.

On the other hand, if the sensor is positioned on the exhaust side of the cylinder head, then it is in a more heated area where it may be damaged.

It is, therefore, a principal object of this invention to provide an improved engine sensor and mounting arrangement therefor.

It is a further object of this invention to provide an improved arrangement for mounting a sensor in proximity to the camshaft of an engine and wherein the aforenoted difficulties can be avoided.

It is a still further object of this invention to provide an improved engine camshaft sensor for sensing engine crank angle.

SUMMARY OF THE INVENTION

This invention is adapted to be embodied in an internal combustion engine having an engine casting in which a camshaft for operating valves associated with the engine is rotatably journaled. The camshaft is provided with at least one bearing surface that is engaged by a bearing cap for rotatably journaling the camshaft to an engine casting to which the bearing cap is affixed. A timing sensor is detachably affixed to this bearing cap and has a sensing portion juxtaposed to the camshaft for outputting a signal indicative of the position of the camshaft and, accordingly, the engine output shaft.

In accordance with another feature of the invention, the engine casting is provided with a removable closure for closing the area in which the bearing cap is mounted. This cover has an opening through which the sensor extends for removal of the sensor without removing the cover.

DETAILED DESCRIPTION OF THE PREFERRED EMBODIMENT OF THE INVENTION

Figure 1:
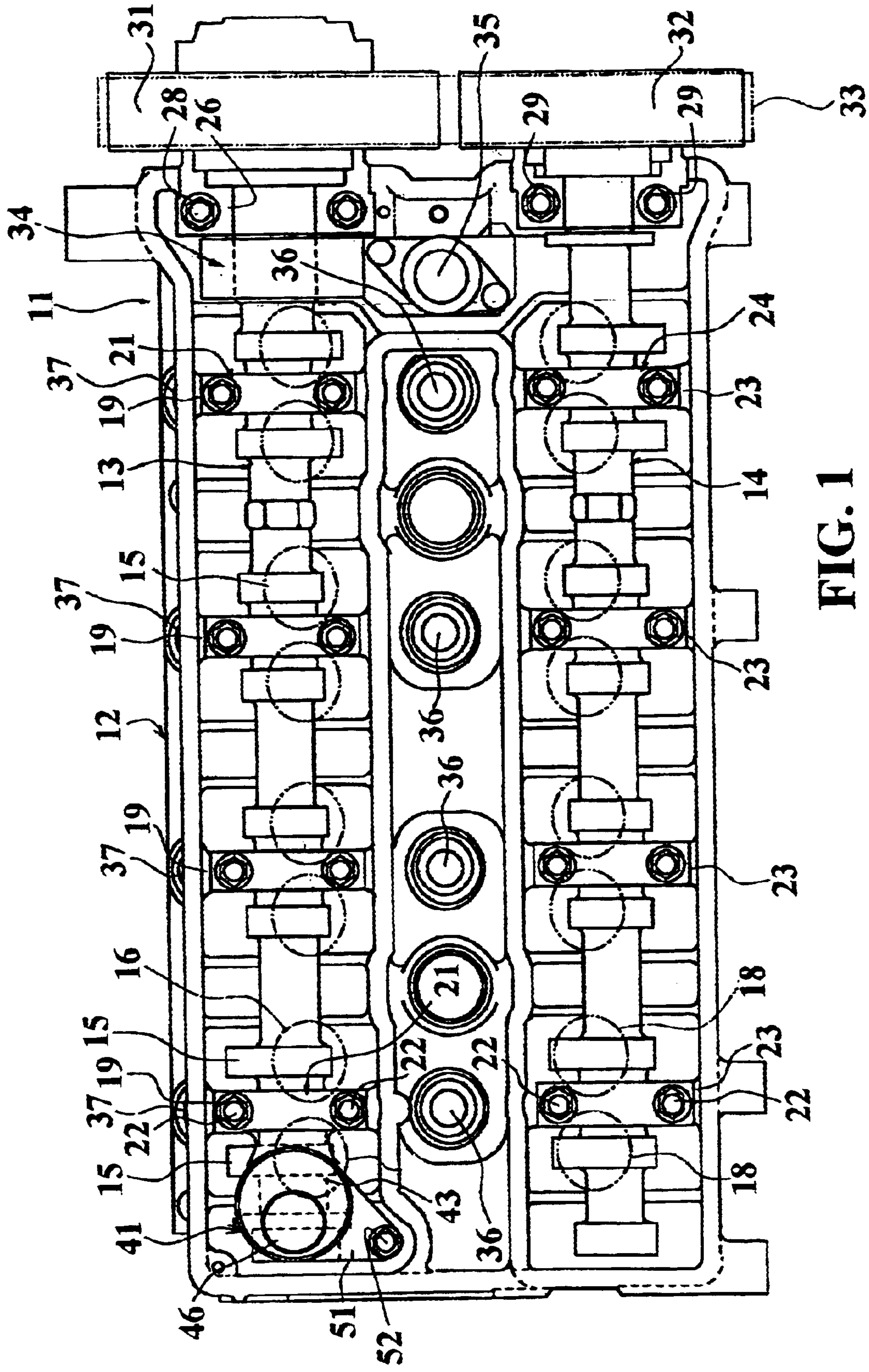
FIG. 1 is a top plan view of the cylinder head of an internal combustion engine constructed in accordance with an embodiment of the invention, with the auxiliaries as well as the cam cover and timing chain cover removed.
Figure 2:
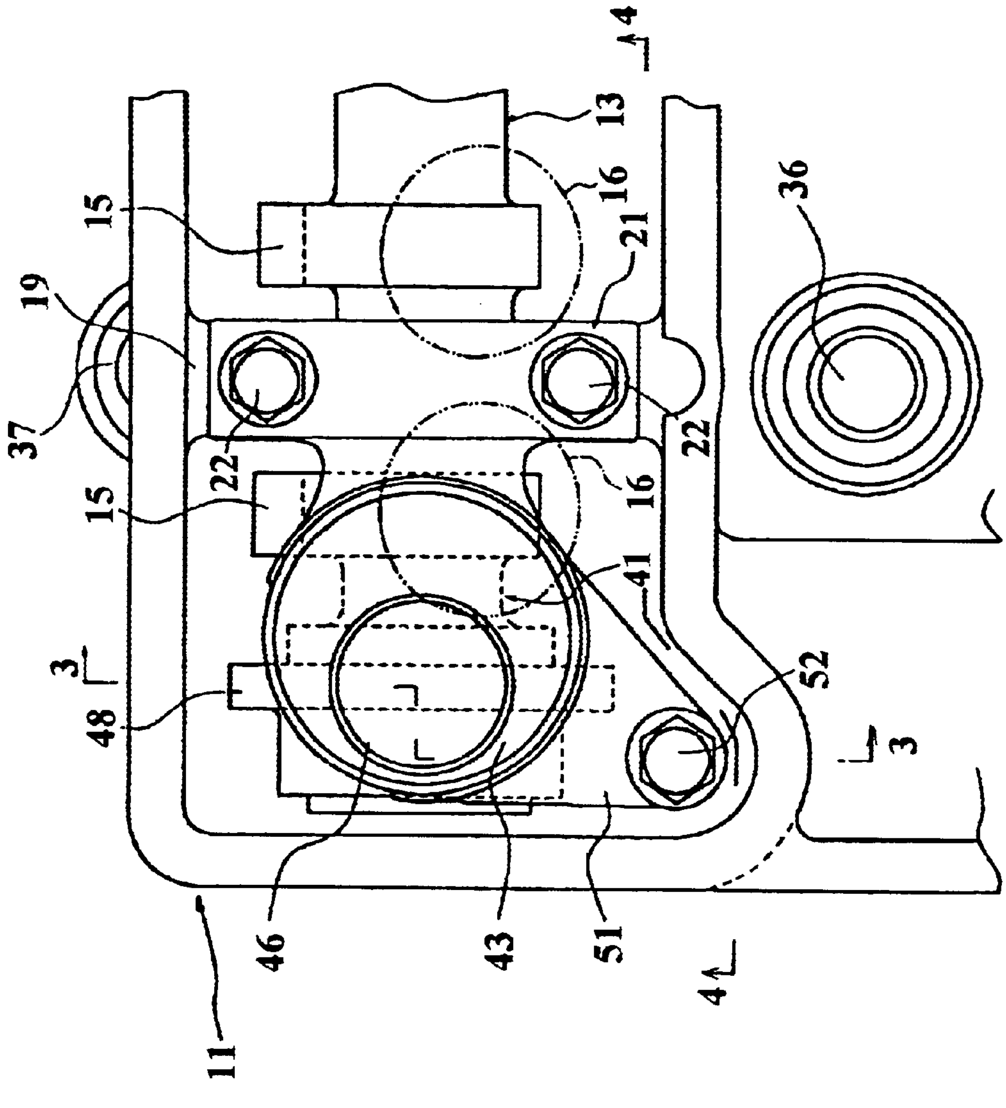
FIG. 2 is an enlarged top plan view in the area of the rear side of the intake camshaft, looking in the same direction and shown in the same condition as FIG. 1, and shows how the timing sensor is mounted and related to this camshaft.

In the figures a portion of an internal combustion engine that embodies the invention is shown and is identified generally by the reference numeral 11. The engine portion 11 comprises a part of a cylinder head assembly of the engine with portions, as noted in the brief description of the drawings, removed. The removed portions comprise the intake and exhaust manifolds and associated induction and exhaust systems, the timing case cover, the spark plugs, fuel injectors, and cam cover. These components are removed in FIG. 1 so as to more clearly show the construction associated with the invention, which relates to the engine timing sensor and its mounting arrangement. The removed portions may be considered to be of any conventional construction.

In the illustrated embodiment, the cylinder head 11 is that of either a four-cylinder in-line engine or the cylinder head of one bank of a V- or opposed-type eight-cylinder engine. Although the invention is described in conjunction with engines having such configurations, it will be readily apparent to those skilled in the art how the invention may be applied to engines having other cylinder numbers and other cylinder configurations.

The cylinder head assembly 11 is comprised of a main cylinder head casting 12 which is adapted to be affixed in sealing relationship to an associated cylinder block to form the combustion chambers of the engine. For the reasons aforenoted, a description of the remaining construction of the engine is not believed to be necessary to permit those skilled in the art to practice the invention. Therefore it is not shown and will not be described.

In the illustrated embodiment, the cylinder head 11 is for a twin overhead cam engine, and therefore includes an intake camshaft 13 and an exhaust camshaft 14 that are rotatably journaled within the cylinder head casting 12 in a manner which will be described. The intake camshaft 13 has individual cam lobes 15 that cooperate with suitable valve actuating mechanisms such as thimble tappets or the like 16 for operating intake valves that are slidably supported in the cylinder head casting 12 in any manner well known in this art.

In a like manner the exhaust camshaft 14 has cam lobes 17 that cooperate with suitable actuating mechanisms such as thimble tappets 18 for actuating exhaust valves which are also mounted in the cylinder head casting 12 in a known manner.

In the illustrated embodiment, the engine is depicted as being of the four-valve-per-cylinder type. Again, this is only exemplary of one way in which the invention may be practiced and any known type of valve arrangement may be employed. In addition, the porting associated with the intake valves and exhaust valves is not depicted for reasons which have also been noted and should be readily apparent.

In the illustrated construction, the intake camshaft 13 is provided with individual bearing surfaces disposed between the cam lobes 15 for each cylinder. These bearing surfaces are journaled within integral cylinder head casting bearing surfaces 19 that are formed in the cylinder head casting 12 and which generally have cylindrical segmented surfaces that are complementary to the camshaft bearing surfaces.

In addition, intake camshaft bearing caps, indicated generally by the reference numeral 21, each have similar semi-cylindrical bearing surfaces that cooperate with the cylinder head bearing surfaces for journaling these camshaft bearing surfaces. The bearing caps 21 are affixed to the cylinder head by threaded fasteners 22 in a manner that is well known in this art.

In a similar manner the exhaust side of the cylinder head casting 12 is provided with integral exhaust camshaft bearing surfaces 23 which cooperate with bearing surfaces formed on the exhaust camshaft 14 between the pairs of lobes 17 associated with each cylinder. Bearing caps 24 are affixed to the cylinder head casting 12 by threaded fasteners 25 so as to complete the journal support for the exhaust camshaft 14.

In addition to these intermediate bearing supports, the intake and exhaust camshafts 13 and 14 are provided with end bearing surfaces on the forward or driving end which are journaled in complementary bearing surfaces formed in the ends of the cylinder head casting 12 and by respective bearing caps 26 and 27 that are affixed to the cylinder head casting 12 by threaded fasteners 28 and 29, respectively.

The drive for the intake and exhaust camshafts 13 and 14 is provided at this end of the engine. This drive is comprised of a pair of sprockets or tooth pulleys 31 and 32 which are affixed either to the ends of the camshafts 13 and 14 or to a variable valve timing mechanism VVT (as will be described) in a known manner. A tooth timing belt or chain 33 is driven by the engine output shaft and engaged with the camshaft sprockets or pulleys 31 and 32 for driving the camshafts 13 and 14 at one-half engine speed, as is well known in this art.

In the specific embodiment illustrated, a variable valve timing mechanism 34 is interposed between the intake camshaft sprocket 31 and the intake camshaft 13. This VVT mechanism 34 affords an arrangement for varying the timing of the intake camshaft 13 relative to the exhaust camshaft 14 in any manner known in the art. This variable timing is controlled by a hydraulic mechanism 35 mounted at the front of the cylinder head.

The cylinder head casting 12 is provided with a plurality of tapped spark plug receiving openings 36, one for each cylinder of the engine. These tapped openings 36 are disposed between the intake and exhaust camshafts 13 and 14 and are adapted to mount spark plugs for firing the charge in the respective combustion chambers. As has been previously noted, these spark plugs are not illustrated in the figures.

In a like manner the intake side of the cylinder head casting 12 is provided with a plurality of openings 37 that are adapted to removably mount fuel injectors for spraying a fuel into the intake passages formed in the cylinder head casting 12. Again, these fuel injectors have been deleted from the drawings for illustration purposes.

Figure 3:
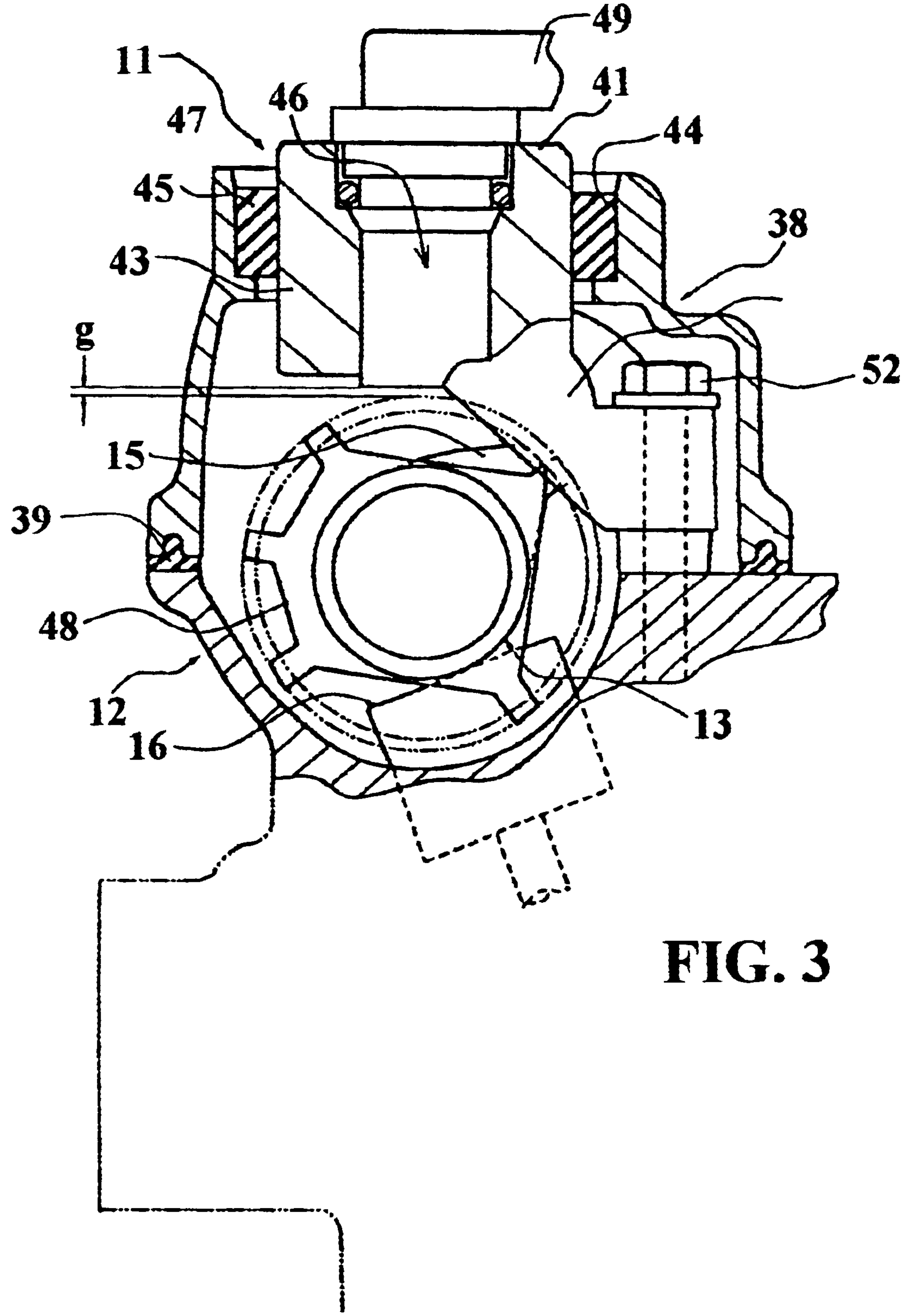
FIG. 3 is an enlarged cross-sectional view taken along the line 3—3 of FIG. 2.
Figure 4:
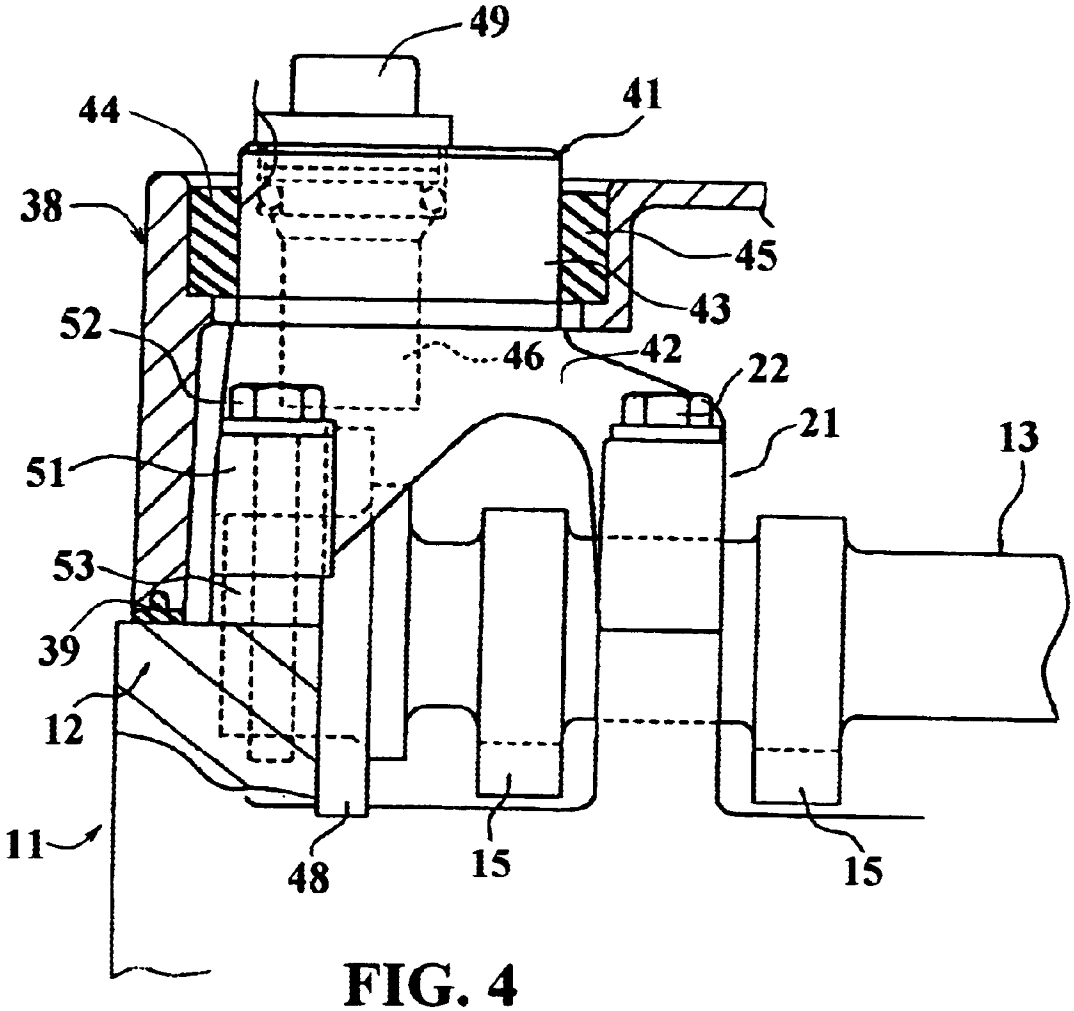
FIG. 4 is an enlarged cross-sectional view taken along the line 4—4 of FIG. 2.

The area of the cylinder head assembly 11 in which the camshafts 13 and 14 are journaled is closed by means of a cam cover which does not appear in FIG. 1, but which is shown clearly in FIGS. 3 and 4 and which is indicated generally by the reference numeral 38. The cam cover 38 is detachably affixed to the cylinder head 12 in any manner well known in this art. As may be seen in FIGS. 3 and 4, a sealing gasket 39 is provided at the lower end of the cam cover 38 for sealingly engaging the peripheral surface of the cylinder head casting 12 which surrounds the camshafts 13 and 14, and specifically the cam chambers formed therein.

The construction of the engine and cylinder head 11 as thus far described may be considered to be conventional. However, in accordance with the invention, the rear bearing cap 21 associated with the rearmost camshaft bearing surface between its lobes 21 is provided with a structure for mounting a timing sensor, indicated generally by the reference numeral 41.

This timing sensor 41 is, in fact, mounted directly on an extension 42 formed integrally with this rearmost bearing cap 21. This extension has a cylindrical portion 43 that extends through a complementary opening 44 formed in the cam cover 38. A sealing gasket or ring 45 is interposed between this cylindrical portion 43 and the opening 44 so as to provide a good seal in this area.

An inductive-type sensor, indicated generally by the reference numeral 46, is mounted in this cylindrical portion 43 of the rear bearing cap extension 42, and specifically within a cylindrical bore 47 formed therein. The sensor 46 cooperates with a timing wheel 48 that is either fixed to or formed integrally with the intake camshaft 13 to the rear of its rear valve actuating lobe 15.

The timing wheel 48 is formed with tooth portions which generate an electrical impulse when they pass the sensor 46 to output a signal through an electrical conductor 49 fixed to the terminals of the sensor 46. The signal are then delivered to a suitable ECU or the like for control of the engine and specifically the systems of the engine which are to be controlled by this sensor.

To provide further support for the sensor 46, the extension 42 of the rear bearing cap 21 is provided with a lug 51 that is fixed to the cylinder head casting 12 by a threaded fastener 52 with an interposed washer 53. Hence, the mounting for the sensor 46 will be quite rigid and a very small gap "g" (FIG. 3) can be maintained between the tip of the sensor 46 and the periphery or teeth of the timing wheel 48. This close fit is maintained while at the same time maintaining the ability to remove and service the sensor 46 without necessitating removal of the cam cover 38.

In the illustrated embodiment, the sensor 46 has been carried by an extension of the rear camshaft bearing cap. It should be readily apparent to those skilled in the art that this sensor may be mounted so as to cooperate with any one of the bearing caps of either the intake or the exhaust camshaft. Various other changes and modifications may be made without departing from the spirit and scope of the invention, as defined by the appended claims.

what is claimed is:

1. A timing arrangement for an internal combustion engine having an engine component in which a camshaft is rotatably journaled, said camshaft being journaled at least in part by a bearing cap affixed to said engine component, and a timing sensor carried by said bearing cap and cooperating with said camshaft for providing a signal indicative of the timing relationship of said engine.

2. A timing arrangement as defined in claim 1, wherein the engine component is formed with an opening through which the bearing cap may be accessed and further including a cover plate affixed to and closing said opening.

3. A timing arrangement as defined in claim 2, wherein the cover is formed with an opening through which the timing sensor extends and through which the timing sensor may be removed and installed.

4. A timing arrangement as defined in claim 3, wherein the bearing cap has a portion that extends through the cover opening.

5. A timing arrangement as defined in claim 1, wherein the engine component comprises a component of a cylinder head assembly.

6. A timing arrangement as defined in claim 5, wherein the engine component is formed with an opening through which the bearing cap may be accessed and further including a cover plate affixed to and closing said opening.

7. A timing arrangement as defined in claim 6, wherein the cover is formed with an opening through which the timing sensor extends and through which the timing sensor may be removed and installed.

8. A timing arrangement as defined in claim 7, wherein the bearing cap has a portion that extends through the cover opening.

9. A timing arrangement as defined in claim 1, further including a toothed timing wheel affixed for rotation with the cam shaft and juxtaposed to said timing sensor.

10. A timing arrangement as defined in claim 9, wherein the engine component is formed with an opening through which the bearing cap may be accessed, and further including a cover plate affixed to and closing said opening.

11. A timing arrangement as defined in claim 10, wherein the cover is formed with an opening through which the timing sensor extends and through which the timing sensor may be removed and installed.

* * * * *